Patented May 7, 1929.

1,712,025

UNITED STATES PATENT OFFICE.

OSCAR R. BROWN, OF DENVER, INDIANA.

YEAST FOOD.

No Drawing. Application filed August 22, 1927. Serial No. 214,785.

This invention relates to improvements in compounds for employment in dough making, and more particularly to a baking composition which reduces the quantity of yeast required and which improves the quality of the baked goods produced.

It has heretofore been proposed to make yeast foods from mixtures of organic and inorganic materials which facilitate the growth of the yeast.

The present invention relates to a compound of this type which is to be mixed with the yeast in making up the batch of dough and which increases the vigor and abundance of the yeast; which during the fermentation or raising period likewise acts on the flour to improve and maintain its quality; and which after consumption acts medicinally upon the human body.

The compound is a dry stable mixture and may be prepared and dispensed cheaply, and stored for long periods of time.

A preferred constitution comprises the following proportions:

|  | Grams. |
|---|---|
| Potassium nitrate | 1.0 |
| Sodium chloride | 0.5 |
| Calcium sulphate | 0.5 |
| Magnesium sulphate | 0.5 |
| Calcium phosphate | 0.5 |
| Total | 3.0 |

A mixture for a batch of dough may be made up as follows:

| Flour | 196 lbs. |
|---|---|
| Salt | 3 lbs. |
| Sugar | 4½ lbs. |
| Milk powder | 4½ lbs. |
| Malt | 1½ lbs. |
| Lard | 4 lbs. |
| Water | 113 lbs. |
| Yeast | 2½ to 3 lbs. |
| Yeast food | 5 ozs. |

This batch is likewise thoroughly mixed and allowed to raise for "40—40—30" fermentation time at a temperature of 80° F. The dough does not gain in temperature during fermentation, but maintains substantially the same temperature at which it came from the dough mixer. When baked it produces 307 one-pound loaves, representing an increased yield over the usual processes, with an improved and more natural golden color of crust. The dough remains on the "young" side during fermentation. The bread when baked is found to hold the moisture better.

The particular ingredients of the yeast food have been selected according to the work each is to accomplish in conjunction with the others. The nitrate is an oxidizer and facilitates the operation of the yeast. The calcium phosphate toughens the gluten to stabilize a weak flour and assist in gas retention: it is itself a strong yeast food and also acts in conjunction with the other foods as an accelerator of their effect: upon consumption it affords mineral food to the body. The sulphates act metabolically to eliminate body poisons, and in particular the magnesium sulphate is assimilated by the yeast as a stimulant to growth and action. The sodium chloride acts to toughen the gluten and adds flavor to the bread, besides its usual physical effects.

By the use of the yeast food less yeast is used initially, but by reason of the rapid budding and growth in the medium the final yeast content is high and the bread when baked is very rich in vitamins. This yeast food does not rot the dough during raising.

It will be understood that my invention is not limited to the specific proportions set forth, but that these may be modified within the scope of the appended claims.

What is claimed as new is:—

1. A yeast food composition for bread making containing potassium nitrate, calcium phosphate and magnesium sulphate.

2. A yeast food composition for bread making comprising one part by weight of potassium nitrate, and one-half part each by weight of magnesium sulphate and calcium phosphate.

In testimony whereof, I affix my signature.

OSCAR R. BROWN.